Patented May 16, 1950

2,508,325

UNITED STATES PATENT OFFICE 2,508,325

METHOD FOR PREPARING CARBOCYANINE DYES

Alfred W. Anish, Vestal, N. Y., assignor to General Aniline & Film Corporation, New York, N. Y., a corporation of Delaware No Drawing. Application February 25, 1948, Serial No. 10,917

9 Claims. (Cl. 260—240.65)

This invention relates to a process of preparing carbocyanine dyes and particularly to a new class of condensing agents employed in such process.

It is known that carbocyanine dyes can be prepared by condensing two mols of a cyclammonium quaternary salt, having a reactive methyl group in the 2-position of the nitrogen atom thereof, with an ortho-ester of a carboxylic acid in the presence of a basic condensing agent. For example, pyridine, methyl pyridine, quinoline, and the like are employed, with or without a basic catalyst such as triethylamine, tributylamine, sodium or potassium carbonate, as basic condensing agents, the function of the condensing agent being to combine with the elements of acid split off during the condensation reaction.

The basic condensing agents presently used present several disadvantages. One disadvantage lies in the case where the cyanine dye base intermediate employed in the condensation reaction or the carbocyanine dye resulting from such reaction is sensitive to basic media, in which case danger of their decomposition or chemical change is always present. Another disadvantage is the period of time required for the condensation reaction to go to completion. By the use of basic condensing agents, the time normally required for such a reaction to go to completion varies anywheres from 45 minutes to 2½ hours. Moreover, basic condensing agents are partially consumed during such reaction, i. e., the acid liberated during the condensation reaction combines with the basic medium.

It is an object of this invention to provide a process for effecting the condensation of a cyclammonium quaternary salt, having a reactive methyl group in the 2-position of the nitrogen atom thereof, with an ortho-ester of a carboxylic acid in the presence of a condensing agent, which does not combine with the acid liberated during the condensation reaction, and which may be employed at higher temperatures so as to facilitate the condensation reaction and permit it to go to completion in a shorter period of time.

Other objects and features of this invention will become apparent as the description proceeds.

The objects outlined above are accomplished by condensing any cyclammonium quaternary salt, having a reactive methyl group in the 2-position to the nitrogen atom thereof, with an ortho-ester of a carboxylic acid in the presence of a condensing agent characterized by the following general formulae:

$$RCOR_1$$

and $$R_2COCH_2COR_3$$

wherein R represents an aromatic radical of the benzene series, e. g., phenyl, vinyl phenyl, hydroxy benzylidene, and the like, $R_1$ represents an alkyl or alkoxy radical of not more than four carbon atoms, e. g., methyl, ethyl, propyl, isopropyl, butyl and isobutyl, methoxy, ethoxy, propoxy or butoxy, or a phenyl radical, $R_2$ represents an alkyl radical of the same value as $R_1$ or phenyl, and $R_3$ reprsents an alkyl or alkoxy radical of the same value as $R_1$.

As examples of compounds illustrative of the above formulae, the following may be mentioned:

$CH_3COCH_2COOCH_3$
Methylacetoacetate $CH_3COCH_2COOC_2H_5$
Ethylacetoacetate $C_6H_5COCH_2COOC_2H_5$
Ethyl benzoylacetate $C_6H_5COOC_2H_5$
Ethyl benzoate $C_6H_5COOC_4H_{10}$
n-Butyl benzoate $C_6H_5CH(OH)COC_6H_5$
Benzoin $C_6H_5COCH_2COCH_3$
Benzoylacetone $C_6H_5CH=CHCOCH_3$
Benzylidene acetone $C_6H_5CH=CHCOC_6H_5$
Benzylideneacetophenone $C_6H_5COCH_2CH_3$
Phenyl ethyl ketone $C_6H_5COCH_2CH_2CH_3$
Phenyl propyl ketone $C_6H_5COCH_2CH_2CH_3$
Phenyl-n-propyl ketone $C_6H_5COCH_3$
Acetophenone $C_6H_5COC_6H_5$
Benzophenone Anyone of the foregoing condensing agents, including mixtures thereof, may be employed in the preparation of carbocyanine dyes in which the trimethine chain is substituted or unsubstituted. A distinction should be drawn between the isolated use of acetone as a solvent, in the preparation of certain sensitizing dye intermediates, and the use of the foregoing compounds as condensing agents. In the present case, the condensing agents do not act as solvents, nor do they act as binding agents for the acid split off during the condensation reaction, and are used only as condensing agents by means of which the condensation reaction goes to completion without the aid or assistance of catalysts or acid binding agents. The principal advantage of the condensing agents is that the time of reaction is considerably shortened, being reduced in some cases to a matter of a few minutes. The quantity of the condensing agent, or mixtures thereof, employed is not critical and the condensation reaction goes to completion whether 1 or 25 mols of the condensing agent per molecular equivalents of the cyclammonium quaternary salt and the ortho-ester of a carboxylic acid are used. The temperature employed in bringing about the condensation reaction is also not critical. The condensation reaction may be conducted by simply heating the coreactants to reflux, or by heating the coreactants on an oil bath at a temperature ranging from 130° to 150° C.

In practicing the present invention, any suitable cyclammonium quaternary salt having a reactive methyl group may be employed as the starting material, such as, for example, 2-methyl heterocyclic nitrogenous quaternary salts characterized by the following general formula:

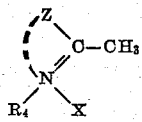

wherein $R_4$ represents an alkyl or aralkyl group, e. g., methyl, ethyl, propyl, butyl, etc., benzyl, methyl benzyl, ethyl benzyl, and the like, X represents an anionic radical, e. g., Cl, Br, I, $ClO_4 SO_4 CH_3$, $SO_4 C_2 H_5$, $SO_3 C_6 H_4 CH_3$, and the like, and Z represents the atoms necessary to complete a 5- or 6-membered heterocyclic nitrogenous nucleus of the type usual in cyanine dyes.

As examples of suitable 2-methyl heterocyclic nitrogenous quaternary salts may be mentioned: 2-methylbenzothiazole, 2-methylbenzoxazole, 2-methylbenzoselenazole, 2 - methylselenazole, 2-methylselenazoline, 2-methyloxazoline, 2-methyl-4-phenyloxazole, 2,5 - dimethyl - thiadiazole, 2-methylpyridine, 2-methylquinoline, 2-methyl-α-naphthothiazole, 2-methyl-β-naphthothiazole, 2-methyl-5-ethoxybenzothiazole, 2-methylthiazole, and the like, as the methiodide, ethiodide, propiodide, methyl-p-toluenesulfonate, and the like.

The ortho-esters of carboxylic acids useful in accordance with the present invention may be simple or mixed and of the aliphatic, cycloaliphatic or aromatic carboxylic acids, including aromatic substituted aliphatic acids and aliphatic substituted aromatic acids. The ortho-esters of carboxylic acids result in carbocyanine dyes which comprise two heterocyclic nitrogenous nuclei bridged by a substituted or unsubstituted trimethenyl chain. The large class of ortho-esters of carboxylic acids, which may be employed, are well known to those skilled in the cyanine dye art and need not be listed herein. As examples of a few typical esters the following may be mentioned: ethyl orthoformate, ethyl orthoacetate, trimethyl orthopropionate, triethyl orthobenzoate, trimethyl ortho-phenyl acetate, trimethyl (ortho-gamma)-phenoxbutyrate, and the like.

For a fuller understanding of the nature and objects of the invention, reference is made to the following examples which are given merely to further illustrate the invention, and they should not be regarded as being limitative.

EXAMPLE I

*1.1'-diethyl - meso - methyl - benzthiocarbocyanine iodide*

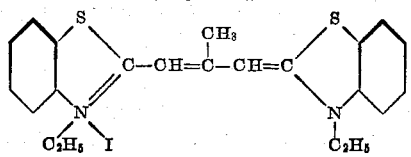

One-half gram of 2-methylbenzothiazole ethiodide and 25.0 cc. of ethyl benzoyl acetate were mixed and heated on an oil bath at 150° C. 2.0 cc. of ethyl o-acetate were added and the heating continued for 5 minutes. The mixture was then cooled quickly. After filtering, the dye crystals, which formed, were washed with ether and water and recrystallized from methanol.

EXAMPLE II

*1.1'-diethyl - 6.6'-diphenyl - meso-ethylbenzoxocarbocyanine iodide*

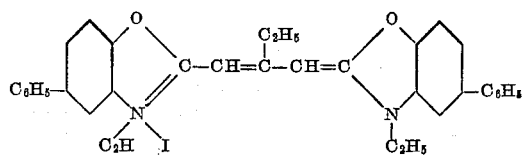

A mixture of 1.0 gram of 2-methyl-6-phenyl-benzoxazole ethiodide and 2.0 cc. of ethyl o-propionate and 15.0 grams of benzoyl acetone was heated on an oil bath at 140° C. for 7 minutes. The mixture was cooled quickly and ether added. The crystalline precipitate was washed with water and ether. The impurities were extracted with hot ethanol.

EXAMPLE III

*1.1'-diethyl-benzthiocarbocyanine iodide*

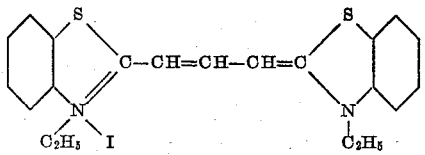

3.4 grams each of 2-methylbenzothiazole ethiodide and ethyl o-formate were heated in a mixture of 15.0 grams of ethyl benzoate for 30 minutes at 150° C. The reaction mixture was cooled, the dye crystals filtered off, washed with ether and water, and recrystallized from methyl alcohol.

EXAMPLE IV

*1.1'-diethyl-meso - ethyl - benzoxocarbocyanine iodide*

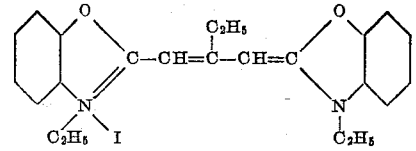

A mixture of 1.0 gram of 2-methylbenzoxazole ethiodide, 2.0 cc. ethyl ortho-propionate and 15.0 grams of benzoyl acetone was heated to reflux for 1½ minutes, then quickly cooled and ethyl ether added. The oil which precipitated was separated from the ether by decantation and again washed with a second portion of ether. The oily residue was dissolved in 5.0 cc. of 95% ethyl alcohol and crystallized on standing.

EXAMPLE V

Example IV was repeated with the exception that 15 grams of benzoyl acetone was replaced by 15 grams of acetone. After 15 minutes of heating at reflux no indication of a condensation reaction was evident.

This application is a continuation in part of my co-pending application, Serial No. 520,777, filed February 2, 1944, now abandoned.

While there have been pointed out above certain preferred embodiments of the invention, the same is not limited to the foregoing examples, illustrations or to the specific details given therein, but is capable of variations and modifications as to the co-reactants, proportions and conditions employed. Accordingly, it is intended that the invention be defined only by the accompanying claims in which it in intended to include all features of patentable novelty residing therein.

I claim:

1. A process for producing carbocyanine dyes which consists of heating two molecular proportions of a cyclammonium quarternary salt of the type usual in the preparation of cyanine dyes and containing a reactive methyl group in the 2-position of the nitrogen atom thereof with one molecular proportion of an ortho-ester of a carboxylic acid in the presence of a condensing agent corresponding to the following general formulae:

$$RCOR_1$$

and $$R_2COCH_2COR_3$$

wherein R represents an aromatic radical of the benzene series, $R_1$ represents a member selected from the class consisting of phenyl, and alkyl and alkoxy radicals of not more than 4 carbon atoms, $R_2$ represents a member selected from the class consisting of phenyl and an alkyl radical of not more than 4 carbon atoms, and $R_3$ represents a member selected from the class consisting of alkyl and alkoxy radicals of not more than 4 carbon atoms.

2. A process for producing a carbocyanine dye which consists of heating two molecular proportions of 2-methylbenzothiazole ethiodide with one molecular proportion of an ortho-ester of a carboxylic acid in the presence of a condensing agent corresponding to the following general formulae:

$$RCOR_1$$

and $$R_2COCH_2COR_3$$

wherein R represents an aromatic radical of the benzene series, $R_1$ represents a member selected from the class consisting of phenyl, and alkyl and alkoxy radicals of not more than 4 carbon atoms, $R_2$ represents a member selected from the class consisting of phenyl and an alkyl radical of not more than 4 carbon atoms, and $R_3$ represents a member selected from the class consisting of alkyl and alkoxy radicals of not more than 4 carbon atoms.

3. A process for producing a carbocyanine dye which consists of heating two molecular proportions of 2-methyl-6-phenylbenzoxazole ethiodide with one molecular proportion of an ortho-ester of a carboxylic acid in the presence of a condensing agent corresponding to the following general formulae:

$$RCOR_1$$

and $$R_2COCH_2COR_3$$

wherein R represents an aromatic radical of the benzene series, $R_1$ represents a member selected from the class consisting of phenyl, and alkyl and alkoxy radicals of not more than 4 carbon atoms, $R_2$ represents a member selected from the class consisting of phenyl and an alkyl radical of not more than 4 carbon atoms, and $R_3$ represents a member selected from the class consisting of alkyl and alkoxy radicals of not more than 4 carbon atoms.

4. A process according to claim 1, wherein the condensing agent is ethyl benzoyl acetate.

5. The process according to claim 1 wherein the condensing agent is benzoyl acetone.

6. The process according to claim 1 wherein the condensing agent is ethyl benzoate.

7. A process for producing a carbocyanine dye which consists of heating two molecular proportions of 2-methylbenzthiazole ethiodide with one molecular proportion of ethyl-o-acetate in the presence of ethyl benzoyl acetate as a condensing agent.

8. The process for producing a carbocyanine dye which consists of heating two molecular proportions of 2-methyl-6-phenylbenzoxazole ethiodide with one molecular proportion of ethyl-o-propionate in the presence of benzoyl acetone as a condensing agent.

9. The process for producing a carbocyanine dye which consists of heating two molecular proportions of 2-methylbenzothiazole ethiodide with one molecular proportion of ethyl orthoformate in the presence of ethyl benzoate as a condensing agent.

ALFRED W. ANISH.

REFERENCES CITED

The following references are of record in the file of this patent:

UNITED STATES PATENTS

| Number | Name | Date |
|---|---|---|
| 1,846,303 | Brooker | Feb. 23, 1932 |
| 2,173,486 | Schneider | Sept. 19, 1939 |

OTHER REFERENCES

Cook, Chemical Society Journal (1944) (received Apr. 24 1944), pp. 482–486.